(12) United States Patent
Ebe

(10) Patent No.: US 6,571,411 B1
(45) Date of Patent: Jun. 3, 2003

(54) SEAT CUSHION AND METHOD OF MANUFACTURING THE SAME

(75) Inventor: Kazushige Ebe, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 215 days.

(21) Appl. No.: 09/715,060

(22) Filed: Nov. 20, 2000

(30) Foreign Application Priority Data

Dec. 8, 1999 (JP) .......................................... 11-349129

(51) Int. Cl.⁷ ................................................ A47C 7/18
(52) U.S. Cl. ...................................... 5/653; 297/452.27
(58) Field of Search ....................... 297/452.26, 452.27, 297/452.21; 5/653

(56) References Cited

U.S. PATENT DOCUMENTS

| | | | | |
|---|---|---|---|---|
| 3,161,436 A | * | 12/1964 | Hood .......................... 264/229 |
| 3,939,508 A | * | 2/1976 | Hall et al. .............. 297/DIG. 1 |
| 4,086,675 A | * | 5/1978 | Talbert et al. .......... 297/DIG. 1 |
| 4,223,101 A | * | 9/1980 | Fine et al. .................... 528/76 |
| 4,443,286 A | * | 4/1984 | Ikeda et al. ................. 156/245 |
| 4,683,246 A | * | 7/1987 | Davis et al. ................... 521/54 |
| 4,895,878 A | * | 1/1990 | Jourquin et al. ............ 521/103 |
| 4,995,926 A | * | 2/1991 | Urai ............................. 156/155 |
| 5,200,252 A | * | 4/1993 | Kelman ....................... 428/159 |
| 5,400,490 A | * | 3/1995 | Burchi ....................... 264/46.4 |
| 5,544,942 A | * | 8/1996 | Vu Khac et al. ........ 297/452.37 |
| 5,603,874 A | * | 2/1997 | Ishii et al. ................ 264/271.1 |
| 5,615,927 A | * | 4/1997 | Kassai .................... 297/452.24 |
| 5,766,387 A | * | 6/1998 | Wolf et al. ................. 156/62.4 |
| 5,944,389 A | * | 8/1999 | Zenba et al. .................... 156/78 |
| 5,989,699 A | * | 11/1999 | Kuczynski et al. ........ 264/46.6 |
| 6,156,864 A | * | 12/2000 | Ohkubo et al. ............. 521/159 |
| 6,256,819 B1 | * | 7/2001 | Maier et al. ........... 297/452.26 |

FOREIGN PATENT DOCUMENTS

JP            411107039 A   *   4/1999   ............. D01F/6/70

OTHER PUBLICATIONS

FLOBEDs.com Latex Mattress Core Fact Sheet; undated, from the internet <URL www.flobeds.com/mattspec.htm, 2 pages.*

* cited by examiner

Primary Examiner—J. J. Swann
Assistant Examiner—Katherine Mitchell
(74) Attorney, Agent, or Firm—Kanesaka & Takeuchi

(57) ABSTRACT

A seat cushion is formed of a lower body and an upper body. The lower body is made of a polyurethane chip molded product containing fibrillated polyurethane chips with radial projections and a binder for binding the fibrillated polyurethane chips. The polyurethane chip molded product has 25 percent ILD hardness of 1,000 to 5,000 N and a density of 150 to 300 kg/M³. The upper body is made of soft polyurethane foam molded on the lower body. The upper body has 25 percent ILD hardness of 60 to 300 N and a density of 20 to 80 kg/M³.

4 Claims, 2 Drawing Sheets

SEAT CUSHION AND METHOD OF MANUFACTURING THE SAME

FIELD OF THE INVENTION AND RELATED ART STATEMENT

The present invention relates to a seat cushion of a passenger seat for use in vehicles and to a method of manufacturing the same.

A seat cushion of a passenger seat for use in vehicles such as passenger cars comprises a cushioned upper body and a lower body beneath the upper body. The upper body provides an occupant comfort when the occupant sits thereon. The lower body gives structural strength and rigidity to the seat cushion. The lower body has brackets for the installation of the seat cushion to a vehicle structural member. The brackets are embedded in the lower body such that portions of the brackets project from the bottom surface of the seat cushion. The top surface and side surfaces of the seat cushion are covered by a trim cover made of covering material such as cloth and leather.

The upper body of the seat cushion is typically formed of soft polyurethane foam while the lower body is formed of rigid hollow plastic, metal member, or high density foam. PCT/CA94/00109 (WO94/19209) discloses that the lower body is formed of rigid polyurethane foam. According to this publication, the formation of the lower body of the rigid polyurethane foam exhibits the following effects:

i) since the lower body is formed of the same material as the upper body, recycling of the seat cushion is simplified as compared to a case that the lower body is formed of a material, such as metal, different from that of the upper body; and ii) the weight of the seat cushion is lighter than that of the seat cushion of which the lower body is formed of metal. As a result, the reduction in weight of a vehicle is achieved.

However, the recycling of rigid polyurethane foam itself is not easy. In addition, the rigid polyurethane foam has the following disadvantages in producing a molded product as a lower body of a seat cushion.

I. It is impossible to form an inverted-taper-shaped molded product from rigid polyurethane foam. Accordingly, the rigid polyurethane foam gives restraints on the configuration and the construction of the lower body.

II. The lower body is thin and has a large flat surface area. Since the viscosity of foamable liquid of the rigid polyurethane foam is high, the foamable liquid is hard to flow to every corner of a mold. This may be a cause of defective products.

III. It is difficult to control the hardness of the rigid polyurethane foam. Therefore, there is some difficulty in making the lower body having a desired hardness from the rigid polyurethane foam.

OBJECT AND SUMMARY OF THE INVENTION

It is a first object of the present invention to provide a seat cushion for use in vehicles which can be easily recycled. It is a second object of the present invention to provide a seat cushion for use in vehicles in which the configuration and the construction of a lower body can be relatively easily changed. Other objects of the present invention will be apparent from the following description.

A seat cushion of the present invention includes a lower body and an upper body made of soft polyurethane foam on the lower body. The lower body and the upper body are integrally formed. The lower body is constituted of a polyurethane chip molded product, a polystyrene molded product, a polyethylene molded product, or a polypropylene molded product.

In the method manufacturing the seat cushion of the present invention, after a molded product composing the lower body is placed in a mold, liquid polyurethane material is poured into the mold and is expanded to integrally form the upper body of soft polyurethane foam on the lower body. The molded product composing the lower body is a polyurethane chip molded product, a polystyrene molded product, a polyethylene molded product, or a polypropylene molded product.

The polyurethane chip molded product can be easily recycled. The polyurethane chip molded product is made of soft polyurethane foam which is the same material of the upper body of the seat cushion and is formed by molding the material with a binder. By removing metallic parts such as brackets, the residues are the upper body and the lower body made only of polyurethane as a whole, so eventual recycling of the seat cushion is simplified.

It is easy to form even an inverted-taper-shaped molded product and a large-sized thin molded product from polyurethane chips. The polyurethane chip molded product of which hardness can be easily controlled can provide a lower body of a seat cushion having a desired configuration and hardness.

Carbon dioxide is generated while the liquid polyurethane material is expanded. By ensuring a discharge route of the carbon dioxide, a high quality soft polyurethane foam can be formed. Porous cells of polyurethane chip molded product function as the discharge route of the carbon dioxide, thereby forming the upper body of a high quality soft polyurethane foam.

Though a polystyrene (PS) molded product, a polyethylene (PE) molded product, and a polypropylene (PP) molded product are made of materials different from the soft polyurethane foam of the upper body, the recycling is quite easy because they are thermoplastic resins. Such molded product is recycled after separated from the upper body and removing the brackets of the seat cushion.

The PS molded product, the PE molded product, and the PP molded product can provide even an inverted-taper-shaped molded product and a large-sized thin molded product because of their excellent moldability. Any one of the molded products has low density, thereby reducing the weight of the seat cushion and the vehicle.

The polyurethane chip molded product used in the present invention is preferably made by press-molding chips of soft polyurethane foam together with a binder. It is further preferable that at least some of said chips are chips made by fibrillating soft polyurethane foam.

The soft polyurethane foam composing the upper body preferably has a 25 percent ILD hardness of 60 to 300 N and a density of 20 to 80 $kg/m^3$.

The polyurethane chip molded product constituting the lower body preferably has a 25 percent ILD hardness of 300 N or more, particularly from 1000 to 5000 N and a density of 100 $kg/m^3$ or more, particularly from 150 to 300 $kg/m^3$.

BRIEF DESCRIPTION OF THE DRAWINGS

FIG. 1a is a perspective view showing a passenger seat in a vehicle according to an embodiment of the present invention and FIG. 1b is a sectional view taken along a line B—B of FIG. 1a.

DETAILED DESCRIPTION OF PREFERRED EMBODIMENTS

Figure 1A:
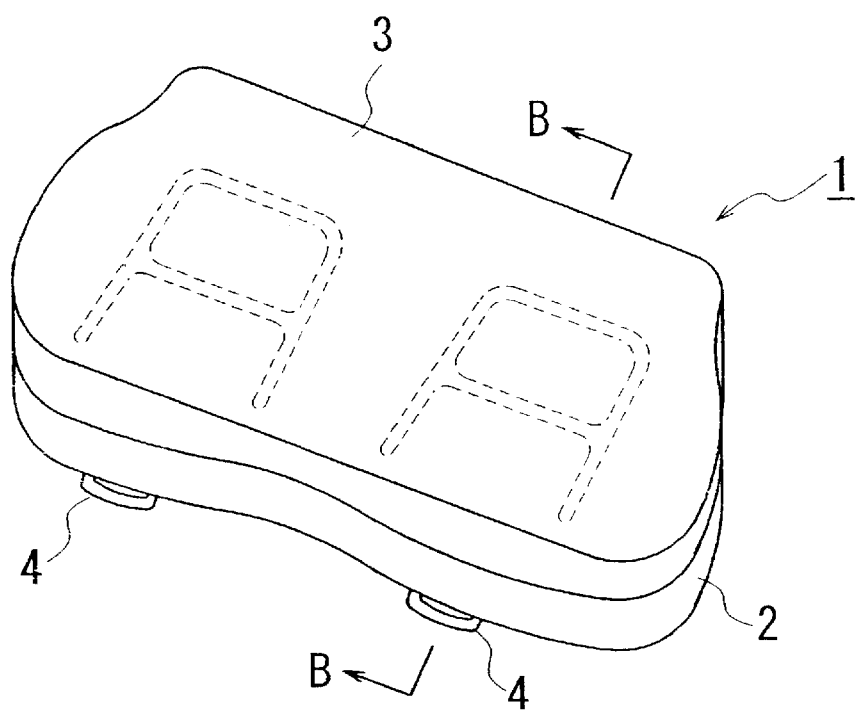
Figure 1B:
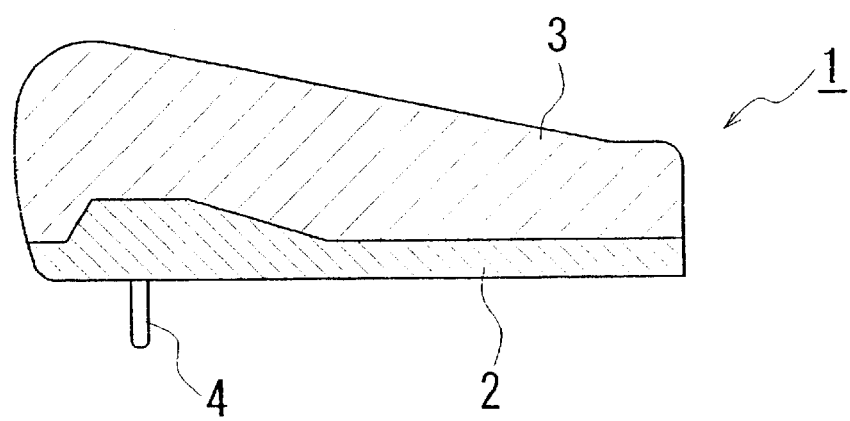

A passenger seat 1 of the present invention which is shown in FIGS. 1a, 1b comprises a lower body 2 and an upper body 3 made of soft polyurethane foam which is positioned above the lower body 2. The lower body 2 and the upper body 3 are integrally formed. The lower body 2 is constituted of a polyurethane chip molded product, a PS molded product, a PE molded product, or a PP molded product.

After the polyurethane chip molded product, the PS molded product, the PE molded product, or the PP molded product composing the lower body 2 is placed in a mold, liquid polyurethane material is poured into the mold. The liquid polyurethane material is expanded to form the upper body 3 of the soft polyurethane foam on the molded product of the lower body 2.

The polyurethane chip molded product, the PS molded product, the PE molded product, or the PP molded product has metal brackets 4 of which proximal portions are embedded in the molded product and distal portions are projected from the molded product.

It is preferable that the soft polyurethane foam composing the upper body 3 has a 25 percent ILD (Indentation Load Deflection) hardness (ISO2439-1997) of 60 to 300 N and a density of 20 to 80 kg/m$^3$.

Both the 25 percent ILD hardness less than 60 N and the 25 percent ILD hardness exceeding 300 N can not provide suitable cushioning and thus make an obtained seat uncomfortable. Both the density less than 20 kg/m$^3$ and the density exceeding 80 kg/m$^3$ also make an obtained seat uncomfortable.

It is preferable that the molded product composing the lower body 2 has 25 percent ILD hardness of 300 N or more, particularly preferably 1000 to 5000 N. The lower body 2 is required to have some hardness to ensure the strength and rigidity of the seat cushion. The lower body 2 having a 25 percent ILD hardness of 300 N or more, particularly 1000 N or more can give sufficient strength and rigidity to the seat. However, the lower body 2 having a 25 percent ILD hardness exceeding 5000 N has unpreferable large weight.

The density of the polyurethane chip molded product achieving the aforementioned preferred 25 percent ILD hardness is 100 kg/m$^3$ or more, particularly 150 to 300 kg/m$^3$.

The density of PS molded product achieving the aforementioned preferred 25 percent ILD hardness is 25 kg/m$^3$ or more, particularly 50 to 100 kg/m$^3$. The density of PE molded product achieving the aforementioned preferred 25 percent ILD hardness is 25 kg/m$^3$ or more, particularly 50 to 100 kg/m$^3$. The density of PP molded product achieving the aforementioned preferred 25 percent ILD hardness is 25 kg/m$^3$ or more, particularly 50 to 100 kg/m$^3$.

Description will now be made as regard to the polyurethane chip molded product suitable as the component of the lower body 2.

The polyurethane chip molded product is manufactured by press-molding polyurethane chips together with a binder. At least some of the polyurethane chips used hereto are preferably made by fibrillating soft polyurethane foam. Since the specific surface area of the fibrillated polyurethane chips is larger than that of spherical polyurethane chips, the touch area between the fibrillated polyurethane chips is large. Therefore, the fibrillated polyurethane chips are strongly bonded to each other. As a result, the chip molded product has improved properties such as tensile strength, tear strength, and impact resilience.

All of the polyurethane chips composing the polyurethane chip molded product may be fibrillated polyurethane chips. Alternatively, the polyurethane chips may be a mixture of spherical polyurethane chips and fibrillated polyurethane chips.

The polyurethane chips are preferably made by fibrillating soft polyurethane foam, formed in a sheet-like configuration having a thickness in a range from 20 mm to 200 mm, by a fibrillating apparatus. Each of the polyurethane chips fibrillated by the fibrillating apparatus has a plurality of projections radially projecting, i.e. a star-like shape.

When spherical polyurethane chips are used together with the fibrilated polyurethane chips, the spherical polyurethane chips are preferably made by crushing soft polyurethane foam by a normal polyurethane foam crusher. Each of spherical polyurethane chips has a long diameter and a short diameter of which ratio is 2 or less, particularly preferably 1.3 or less. The spherical polyurethane chips preferably have such particle diameter as to pass through a screen having opening diameter in a range from 5 mm to 50 mm.

The spherical polyurethane chips are preferably mixed to the fibrillated polyurethane chips in such a manner that the ratio of the fibrillated polyurethane chips to the entire polyurethane chips is 10 weight % or more, particularly 20 weight % or more. The fibrillated polyurethane chips are each interposed between the spherical polyurethane chips and strongly bonded to the spherical polyurethane chips, thereby improving the properties, such as strength, of the molded product.

The density of the fibrillated polyurethane chips may be equal to and is preferably less than the density of the spherical polyurethane chips. When the density of the fibrillated polyurethane chips is set to be less than the density of the spherical polyurethane chips, spaces among the spherical polyurethane chips are filled with the fibrillated polyurethane chips because the fibrillated polyurethane chips are shrank largely than the spherical polyurethane chips during the press molding, thereby improving the properties of the molded product such as strength and resiliency. The density of the fibrillated polyurethane chips is preferably in a range from 15% to 100%, more preferably in a range from 30% to 50% of the spherical polyurethane chips.

To mold these polyurethane chips, the polyurethane chips and a binder may be separately supplied to a mold, but it is preferable that the binder is previously bonded to the polyurethane chips.

Suitably used as this binder is of urethane prepolymer type, but not limitative thereto.

Other binders may be used, for example, solvent-based polyurethane or two-part solventless polyutrethane. These binders include, as the principal component, polymeric materials containing active isocyanate. As for the solvent-based polyurethane, the polymeric materials should be diluted with organic solvent because of their high viscosity. Halogenated solvent such as methylene chloride is generally employed as the organic solvent in order to satisfy conditions including volatility and non-combustibility. The two-part solventless polyurethane is of a two-part type in which amine hardener is used.

Aqueous emulsion may be used as the binder. Examples of aqueous resin emulsion include polyurethane emulsion group, poly acrylic ester emulsion group, polyvinyl acetate emulsion group, poly (ethylene/vinyl acetate) copolymer emulsion group, and poly (styrene/butadiene)copolymer emulsion group. These can be used singly, or in combination of two or more kinds. Alternatively, modified-resin emulsion prepared by modifying the resins may also be employed.

The bonded amount of the binder is preferably 3–20 weight %, more preferably 5–15 weight % of the polyurethane chips, as in form of solid state.

To bond the binder, spraying the binder is preferable. The binder may be sprayed while agitating the polyurethane chips.

To form the polyurethane chip molded product, the polyurethane chips bonded with the binder in the aforementioned manner is filled in a mold having a predetermined configuration corresponding to the lower body of the seat cushion. The binder may be bonded to the polyurethane chips after filling the polyurethane chips into the mold. After that, pressure and heat are applied to cause the binder to be hardened, thus manufacturing the polyurethane chip molded product. The pressure should be selected to achieve the density of the end product. The pressure may be applied from one direction i.e. by uniaxial press or from plural directions i.e. by multiaxial press.

The brackets for attaching the seat cushion to the vehicle body are previously placed at predetermined positions in the mold so that the brackets are integrated in the polyurethane chip molded product.

To apply heat as mentioned, supplying of hot steam into the mold is preferable. When the binder is aqueous emulsion, hot air may be supplied into the mold.

When a hardened product removed from the mold is wet due to the steam, it is preferable to dry the product. The product may be dried by a dryer or may be dried in air.

According to the polyurethane chip molded product, a molded product having desired hardness can be easily obtained by controlling the hardness, the size, and the density of used chips, the pressure for press and the temperature for heating during the molding, and the kind of binder and adhesive.

Figure 2:
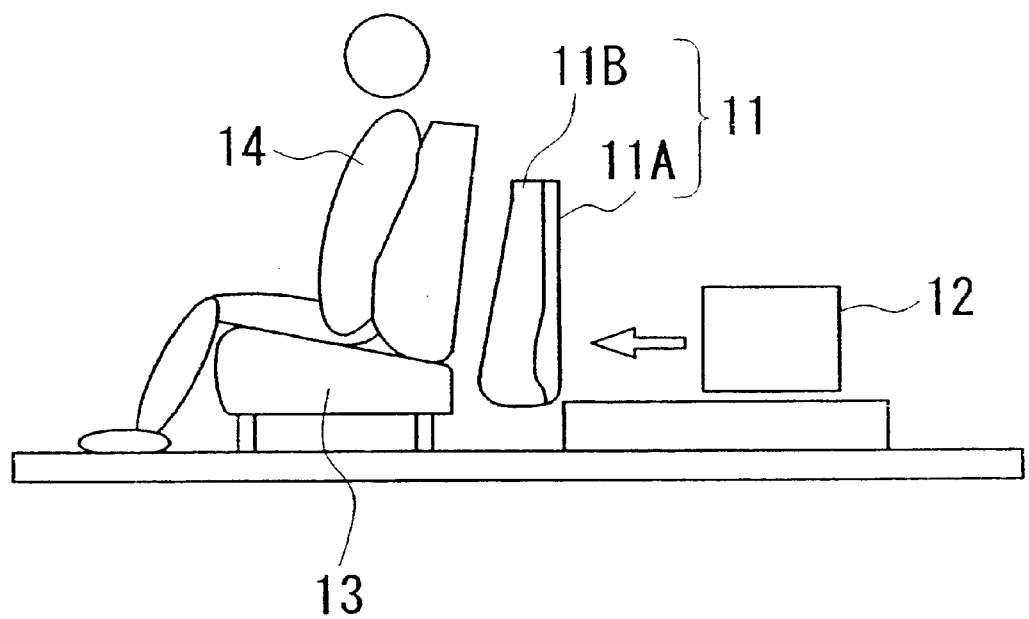
FIG. 2 is a side view schematically showing a situation in a vehicle cabin in case of a frontal collision of a vehicle.

A lower body 11A of a seat cushion 11 of a rear passenger seat may be fabricated from the molded product having high hardness. As shown in FIG. 2, the seat cushion 11 of the rear seat can be made by molding an upper body 11B onto the lower body 11A. In FIG. 2, the seat cushion 11 of the rear passenger seat is risen and a luggage 12 is placed behind the seat cushion 11. The lower body 11A of the seat cushion 11 absorbs the impact of the luggage 12 plunging into the seat cushion 11 from the behind in the event of a vehicle collision, thereby protecting an occupant 14 sitting in a front passenger seat 13.

The seat cushion shown in FIGS. 1a and 1b is only an example of the embodiment of the present invention. The present invention is not limited to the shown example and changes and variations may be made without departing from the spirit of the present invention.

The seat cushion of the present invention is not limited to a seat cushion of a rear passenger seat and can be applied to a seat cushion of a front passenger seat. Vehicles are also not limited and may be passenger cars, buses, trucks, and working cars.

As described in detail in the above, the seat cushion of the present invention can be easily recycled. The seat cushion has higher degree of freedom on the configuration and the construction.

What is claimed is:

1. A seat cushion comprising:
   a lower body made of a polyurethane chip molded product containing fibrillated polyurethane chips with radial projections and a binder for binding the fibrillated polyurethane chips, said polyurethane chip molded product formed of said fibrillated polyurethane chips and binder integrally molded together having 25 percent ILD hardness of 1,000 to 5,000 N and a density of 150 to 300 kg/m$^3$, and
   an upper body made of soft polyurethane foam molded on the lower body, said upper body having 25 percent ILD hardness of 60 to 300 N and a density of 20 to 80 kg/m$^3$.

2. A seat cushion according to claim 1, wherein said polyurethane chip molded product is made only by the fibrillated polyurethane chips with the radial projections and the binder.

3. A seat cushion according to claim 1, wherein said polyurethane chip molded product further includes spherical polyurethane chips together with the fibrillated polyurethane chips.

4. A method of manufacturing a seat cushion, comprising:
   placing fibrillated polyurethane chips with radial projections and a binder for binding the fibrillated polyurethane chips into a mold, and forming a lower body of polyurethane chip molded product to have 25 percent ILD hardness of 1,000 to 5,000 N and a density of 150 to 300 kg/m$^3$, and
   disposing the lower body in another mold, pouring a liquid polyurethane material to be located above the lower body in the another mold, and expanding the liquid polyurethane material in the another mold to form an upper body made of soft polyurethane foam integrally molded on the lower body, said upper body having 25 percent ILD hardness of 60 to 300 N and a density of 20 to 80 kg/m$^3$.

* * * * *